US008019631B2

(12) United States Patent
Bredin et al.

(10) Patent No.: US 8,019,631 B2
(45) Date of Patent: Sep. 13, 2011

(54) SYSTEM AND METHOD FOR AUTOMATICALLY SELECTING ONE OR MORE METRICS FOR PERFORMING A CAPACITY MATURITY MODEL INTEGRATION

(75) Inventors: Francis Bredin, Maison-Alfort (FR); Philippe Desbarbieux, Courcouronnes (FR)

(73) Assignee: International Business Machines Corporation, Armonk, NY (US)

( * ) Notice: Subject to any disclaimer, the term of this patent is extended or adjusted under 35 U.S.C. 154(b) by 1311 days.

(21) Appl. No.: 11/567,766

(22) Filed: Dec. 7, 2006

(65) Prior Publication Data
US 2007/0156657 A1 Jul. 5, 2007

(30) Foreign Application Priority Data
Dec. 15, 2005 (EP) .................................. 05301059

(51) Int. Cl.
*G06Q 10/00* (2006.01)
(52) U.S. Cl. ..................................................... 705/7.11
(58) Field of Classification Search ................... 705/7.11
See application file for complete search history.

(56) References Cited

U.S. PATENT DOCUMENTS

| | | | | |
|---|---|---|---|---|
| 6,957,186 B1 * | 10/2005 | Guheen et al. | ............... | 705/323 |
| 7,035,809 B2 * | 4/2006 | Miller et al. | ..................... | 705/8 |
| 7,212,987 B2 * | 5/2007 | Swanke et al. | ............... | 705/7.15 |
| 7,290,275 B2 * | 10/2007 | Baudoin et al. | ................... | 726/1 |
| 7,406,430 B2 * | 7/2008 | Atefi et al. | ......................... | 705/7 |
| 7,672,884 B2 * | 3/2010 | Schuster et al. | ................ | 705/35 |
| 7,703,070 B2 * | 4/2010 | Bisceglia | ....................... | 717/101 |
| 7,761,316 B2 * | 7/2010 | Ligon et al. | ........................ | 705/7 |
| 7,774,743 B1 * | 8/2010 | Sanchez et al. | ............... | 717/103 |
| 7,899,756 B2 * | 3/2011 | Rizzolo et al. | ................ | 705/300 |
| 7,937,281 B2 * | 5/2011 | Miller et al. | ................ | 705/7.11 |
| 2003/0110067 A1 * | 6/2003 | Miller et al. | ..................... | 705/8 |
| 2004/0015377 A1 * | 1/2004 | Hostetler | .......................... | 705/7 |

(Continued)

FOREIGN PATENT DOCUMENTS
WO    WO 01/25970 A1 *   4/2001

OTHER PUBLICATIONS

Appraisal Assistant Beta—CMMI appraisal tool Www.sgi.gu.edu.au, Aug. 2006, Retrieved from Archive.org Sep. 15, 2010.*

(Continued)

*Primary Examiner* — Scott L Jarrett
(74) *Attorney, Agent, or Firm* — Schmeiser, Olsen & Watts; John Pivnichny

(57) ABSTRACT

A computer implemented method for automatically identifying one or more metrics for performing a CMMI evaluation of an entity, wherein the CMMI evaluation is performed at a particular CMMI level and the method comprises the steps of accessing an electronic database of a plurality of candidate metrics, providing a first list of requirement elements to define a set of specific requirements of the entity, providing a second list of requirement elements to define a set of general requirements of the business field of the entity, searching for a first subset of metrics from the plurality of candidate metrics that match the first list and second list of requirement elements, searching for a second subset of metrics from the first subset of metrics that match with the CMMI level, and outputting the second set of metrics in a user-friendly format suitable for the CMMI evaluation.

14 Claims, 2 Drawing Sheets

U.S. PATENT DOCUMENTS

| | | | | |
|---|---|---|---|---|
| 2004/0093584 | A1* | 5/2004 | Le | 717/103 |
| 2005/0080647 | A1* | 4/2005 | Okada et al. | 705/1 |
| 2005/0125272 | A1* | 6/2005 | Hostetler | 705/7 |
| 2005/0144592 | A1* | 6/2005 | Below et al. | 717/124 |
| 2005/0278202 | A1* | 12/2005 | Broomhall et al. | 705/7 |
| 2006/0069540 | A1* | 3/2006 | Krutz | 703/22 |
| 2007/0150293 | A1* | 6/2007 | Dagnino | 705/1 |
| 2008/0115110 | A1* | 5/2008 | Fliek et al. | 717/125 |

OTHER PUBLICATIONS

Isd-inc.com—Appraisal Wizard web pages Integrated Systems Diagnostics, Inc., Dec. 2004, Retrieved from Archive.org Sep. 15, 2010.*

Taking Charge of Your CMMI Implementation Through Automation—Appraisal Wizard Integrated Systems Diagnostics, Inc. 2004.*

HMS.org Web pages—assessment tools May 2003, Retrieved from Archive.org Sep. 15, 2010.*

Sweetser, Wes, Tool to Facilitate CMMI Appraisals 2004 CMMI Conference, Dec. 1, 2004.*

Capability Maturity Model Integration—definition Wikipedia.org, Retrieved Sep. 15, 2010.*

Standard CMMI Appraisal method for Process Improvement (SCAMPI) Version 1.1: Method Definition Document CMU/SEI Handbook, Dec. 2001.*

Systems Security Engineeering Capability Maturity Model—Model & Appraisal Method Summary SSE-CMM.org, Apr. 1999.*

Standard CMMI Appraisal Method for Process Improvement—definition Wikipedia.org, Retrieved Sep. 15, 2010.*

McFeeley, Bob, IDEAL: A User's Guide for Software Process Improvement Software Engineering Institute, Feb. 1996.*

Johnson, Donna L. et al., Tailoring the CMM for Small Businesses, Small Organizations and Small Projects Software Process Newsletter, IEEE, SPN-1, No. 8, Winter 1997.*

Weller, Edward F., Using Metrics to Manage Software Projects IEEE, Sep. 1994.*

Daskalantonkais, Michael K., A Practical View of Software Measurement and Implementation Experiences Within Motorola IEEE, 1992.*

Paul, Raymond A. et al., Software Metrics Knowledge and Databases for Project Management IEEE Transactions on Knowledge and Data Engineering, vol. 11, No. 1, Jan./Feb. 1999.*

Capability Maturity Model Integration (CMMI) Overview Carnegie Mellon Software Engineering Institute, 2005.*

Hayes, Wil et al., Handbook for Conducting Standard CMMI Appraisal Method for Process Improvements (SCAMPI) B and C Appraisals, Version 1.1, Dec. 2005, Software Engineering Institute.*

Kasse, Tim, Practical Insight Into CMMI Artech House computing library, 2004, ISBN: 1-58053-625-5.*

Standard CMMI Appraisal Method for Process Improvement SCAMPI Version 1.1—Method Definition Document CMU/SEI, Handbook, Dec. 2001.*

Wesley, Sweetser, Program Facilitates CMMI Appraisals NASA Tech Briefs, vol. 29, No. 10, Oct. 2005.*

Sweetser, Wesley, Tool to Facilitate CMMI Appraisals 2004 CMMI Conference, Dec. 1, 2004.*

Horch, John W., Practical Guide to Software Quality Management—Second Edition Artech House, Inc., 2003, ISBN: 1-58053-527-5.*

R. Nichols et al., "Software Process Improvement Journey: IBM Australia Application Management Services", Mar. 2005, Technical Report, CMU/SEI-2005-TR-002, ESC-TR-2005-002.

* cited by examiner

SYSTEM AND METHOD FOR AUTOMATICALLY SELECTING ONE OR MORE METRICS FOR PERFORMING A CAPACITY MATURITY MODEL INTEGRATION

TECHNICAL FIELD OF THE INVENTION

The present invention relates to a system and method for automatically selecting one or more metrics for performing a Capability Maturity Model Integration (CMMI) (CMMI is a registered trademark of Carnegie Melon University) evaluation, wherein the system and method are performed electronically and are accessible from the web.

BACKGROUND OF THE INVENTION

Measurement catalogs collate and provide detailed documentation of potential performance metrics. However, at present measurement catalogs only exist in a paper-based format that does not permit convenient updating.

With such paper-based metric catalogs, the process of identifying suitable metrics for monitoring a process is tedious, cumbersome and time-consuming. In particular, it is necessary to use complex and user-unfriendly paper sheets (which do not provide any guidance or support to the user regarding the selection of appropriate metrics). Indeed, the CMMI specification book is the only source of guidance to the user.

Furthermore, since CMMI process areas are not clearly understood, the relationship between the CMMI process areas and the business requirements of a user organization typically had to be manually adjusted. Finally, such previous methods of identifying appropriate metrics are not easily re-used in other circumstances. Consequently, a huge amount of time and effort must be expended using the above-mentioned prior art methods, to enable metrics to be selected for each new client.

When measurement catalogs have been implemented in electronic form (e.g. the IBM Application Services Management (AMS) Measurement Catalog) in the past, the definition of metrics provided therein have been typically insufficient. Furthermore, the relationships between the various components of computed metrics have not been clearly described.

SUMMARY OF THE INVENTION

According to the invention there is provided a computer implemented method for automatically identifying one or more metrics for performing a CMMI evaluation of an entity, wherein the CMMI evaluation is performed at a particular CMMI level and the method comprises the steps of:
  accessing an electronic database of a plurality of candidate metrics;
  providing a first list of requirement elements to define a set of specific requirements of the entity;
  providing a second list of requirement elements to define a set of general requirements of the business field of the entity;
  searching for a first subset of metrics from the plurality of candidate metrics that match the first list and second list of requirement elements;
  searching for a second subset of metrics from the first subset of metrics that match with the CMMI level; and
  outputting the second set of metrics in a user-friendly format suitable for the CMMI evaluation.

According to a second aspect of the invention there is provided an electronic system for automatically identifying one or more metrics for performing a CMMI evaluation of an entity, wherein the CMMI evaluation is performed at a particular CMMI level, the system comprising:
  a database including a plurality of candidate metrics;
  a means of providing a first list of requirement elements to define a set of specific requirements of the entity;
  a means of providing a second list of requirement elements to define a set of general requirements of the business field of the entity;
  a means of searching for a first subset of metrics from the plurality of candidate metrics that match the first list and second list of requirement elements;
  a means of searching for a second subset of metrics from the first subset of metrics that match with the CMMI level; and
  a means of outputting the second set of metrics in a user-friendly format suitable for the CMMI evaluation.

According to a third aspect of the invention there is provided a computer program product stored on a medium readable by a computer machine, the computer program product tangibly embodying readable program means for causing the computer machine to perform the method according to the steps of accessing an electronic database of a plurality of candidate metrics, providing a first list of requirement elements to define a set of specific requirements of the entity, providing a second list of requirement elements to define a set of general requirements of the business field of the entity, searching for a first subset of metrics from the plurality of candidate metrics that match the first list and second list of requirement elements, searching for a second subset of metrics from the first subset of metrics that match with the CMMI level, and outputting the second set of metrics in a user-friendly format suitable for the CMMI evaluation.

BRIEF DESCRIPTION OF THE DRAWINGS

Reference will now be made, by way of example, to the accompanying drawings, in which.

DETAILED DESCRIPTION OF THE PREFERRED EMBODIMENT

Figure 1:
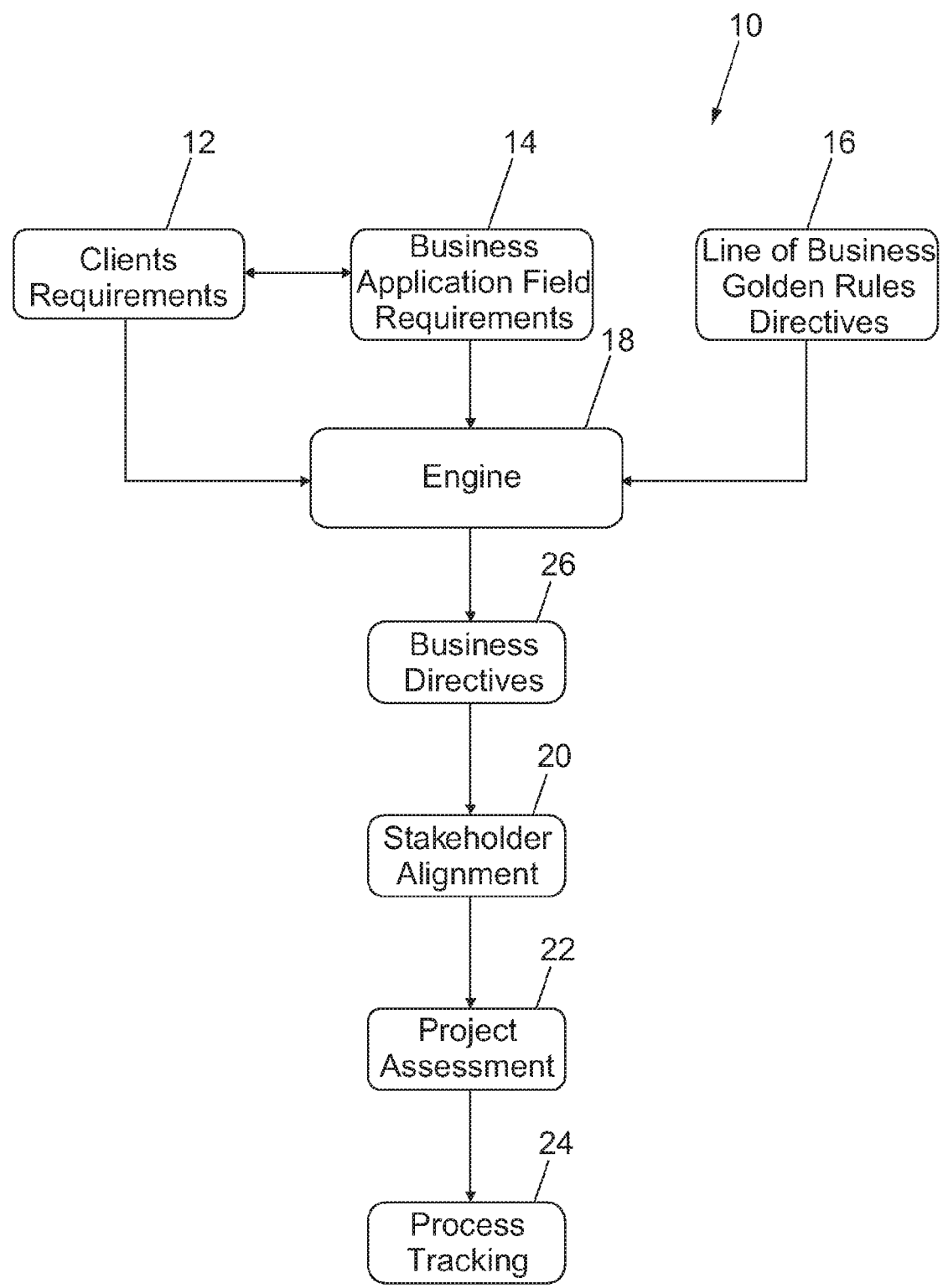
FIG. 1 is a block diagram of the software architecture of an online metrics catalog according to a first aspect of the invention.

Since the online metrics catalogue relates to a catalogue of evaluation metrics, it is useful at this juncture to briefly describe evaluation metrics and the importance of selecting the most appropriate metrics for a given evaluation process. The following discussion will also describe the stages in an evaluation process leading up to the selection of appropriate metrics.

Since metrics are defined within the context of an evaluation process, one of the more well-known evaluation strategies, namely the CMMI model will be described.

The following discussion will then turn to the software architecture of the online metrics catalogue and will finally describe how the online metrics catalogue is used in a CMMI evaluation.

Evaluation Metrics

Improvement of a management process depends upon improved ability to identify, measure, and control essential parameters of a project and/or organization. When used for assessing a software organization, "software metrics" is the identification and measurement of the essential parameters that affect software development. Essentially, software metrics deals with the measurement of a software product and process by which it is developed.

Metrics can be categorized is as primitive metrics or computed metrics. Primitive metrics are variables that can be directly observed, such as program size (in lines of code (LOC)), number of defects observed during unit testing, or total development time for a project. In contrast, computed metrics cannot be directly observed but are computed in some manner from other metrics. Consequently, computed metrics are often more valuable in understanding or evaluating a software process than primitive metrics. Examples of computed metrics are those used for assessing productivity (e.g. LOC produced per person-month), or product quality (e.g. the number of defects per thousand lines of code).

An indicator is a representation of one or more metrics that provides insight into an ongoing project or process improvement activity. For example, an indicator may be the behavior of a metric over time (e.g. number of trouble reports written and resolved over time) or the ratio of two metrics.

The cost of evaluating a project or organization is not inconsiderable. Consequently, even though it may, in principle, be possible to measure a large number of process/organization variables, it may not be economically viable to do so. The challenge of collecting software engineering data is to make sure that the collected data can provide useful information for project, process, and quality management without being overly burdensome on the organization. Therefore, it is important to consider carefully what data to collect. In particular, a chosen metric must be capable of:
  representing the basic business objectives of the organization;
  translating these objectives into more tangible operational objectives; and
  providing adequate indicators to enable the operational objectives of the organization to monitored.

To be representative of the normal business operations of an organization, a selected metric must be measurable within the confines of the normal business operations of the organization. Furthermore, the metric must be compliant with recognized evaluation models (e.g. the CMMI model). Similarly metrics must also to be accurately defined and documented, to be CMMI compliant and more importantly, to enable the metric to be used in a wide variety of domains.

Stages in Developing an Evaluation Strategy

The first stage of an evaluation process must establish very precise goals for the process and only metrics that satisfy these goals should be collected. When metrics are clearly linked to defined goals, individuals will use the metrics because these assist in achieving operational and/or organizational objectives. However, if metrics are not clearly linked to a defined goal, the metrics may have limited, if any, use.

For example, a goal may be generically described by:
  analyzing (the name of the activity or attribute being measured)
  for the purpose of (the overall objective of the analysis)
  with respect to (the aspect of the activity or the attribute being considered)
  from the viewpoint of (the people who have an interest in the measurement)
  in the context of (the environment in which the measurement takes place).

Once the goals of the evaluation process have been established, questions of interest should be defined. Answers to these questions help the management team to determine whether the goals of the evaluation process have been achieved. Each of these questions should be answerable quantitatively thereby providing the metrics for the evaluation process.

Having identified appropriate metrics, the precision of the evaluation must be carefully specified and a collection form (or template) and data fields established.

The Capability Maturity Model Integration (CMMI) Model

The Capability Maturity Model (CMM) (CMM is a registered trademark of Carnegie Melon University) is a well-known evaluation methodology that was initially developed to give the US Department of Defense a yardstick to assess and describe the capability of software contractors to provide software on time, within budget, and to acceptable standards. It quickly evolved into a powerful tool to guide process improvement, not only for software development, but for many related fields including systems engineering, product acquisition, team management and research and development. CMMI is a modification of CMM that can be used to guide process improvement across a project, a division, or an entire organization.

The online metrics catalogue provides a tool that searches through a database of metrics, process indicators and guidelines derived from measurement catalogs, to identify the most appropriate metric(s) for evaluating an organization in a manner that is fully compliant with the CMMI model and the needs of an emerging business. To this end, the online metrics catalog allows searching in all of the dimensions (either alone or in combination) of a metric definition, in accordance with the needs of a client organization.

Accordingly, the online metrics catalog significantly reduces the amount of time required for identifying optimal evaluation metrics. To facilitate this process, the online metrics catalog provides online support and assistance, graphical representation frames and templates. The online metrics catalog also provides descriptions of advanced statistical analytical tools, to allow an organization to identify simple ways of increasing the stability of its processes. The online metrics catalog also automatically generates business directives and basic project management guidance.

Furthermore, the generic approach adopted by the online metrics catalog and its facilities for easy customization enable the catalog to provide substantial improvements in turnaround time throughout a product lifecycle. To facilitate this process, the online metrics catalog integrates accurate process tracking and automatic process adjustment to monitor an overall project evaluation.

The generic approach adopted by the online metrics catalog also provides a framework to allow the addition of further metrics and/or objectives as required. Furthermore, the generic mechanism of the online metrics catalog is compatible with the re-use philosophy and permits approximately 80% of the metrics developed in previous evaluations to be re-used in subsequent evaluations.

In addition, the online metrics catalog can be exported to, and duplicated and replicated in any multi-site organization in a variety of sectors including the manufacturing, financial and pharmaceutical sectors. Finally, the online metrics catalog is based on a generic database that can be accessed from a web portal.

The online metrics catalog can be used as a repository of CMMI information. More particularly, the online metrics catalog enables an evaluator to determine the sources of the primitive metrics used to calculate a computed metric. Furthermore, the online metrics catalog enables an evaluator to determine which algorithm is used to calculate the computed metric and the manner in which the computed metrics can be interpreted and reported.

Furthermore, the online metrics catalog provides a means of searching for appropriate metrics to track how specific objectives are reached. The online metrics catalog also provides a means of searching for objectives that are covered by the metrics already in place; and a means of identifying metrics that can be put in place with the basic data that are already available in the organization Software Architecture of the Online Metrics Catalog Referring to FIG. 1, an online metrics catalog 10 comprises a database of information relating to the client's specific requirements 12 (in particular, the specific goals that the client wants to track). For the sake of simplicity, this information will be known henceforth as the client's requirements 12.

Online metrics catalog 10 further comprises a database of information relating to the more generalized (legal and commercial) requirements of a business field 14 in which the client is involved. For the sake of simplicity, this information will be known henceforth as general business requirements 14. It will be appreciated that in many cases, general business requirements 14 interact or overlap with client's requirements 12.

Online metrics catalog 10 further comprises a Line of Business (LoB) Golden Rules Directives database 16, which comprises a plurality of rules defining various attributes of a metric (for example, how a metric can be calculated, how the metric can be graphically represented and how the metric may be statistically tracked).

Finally, online metrics catalog 10 further comprises:
an online metrics catalog engine 18;
a business directives function 26;
a stakeholder alignment function 20;
a project assessment function 22; and
a project tracking function 24.

Operation of the Online Metrics Catalog

Figure 2:
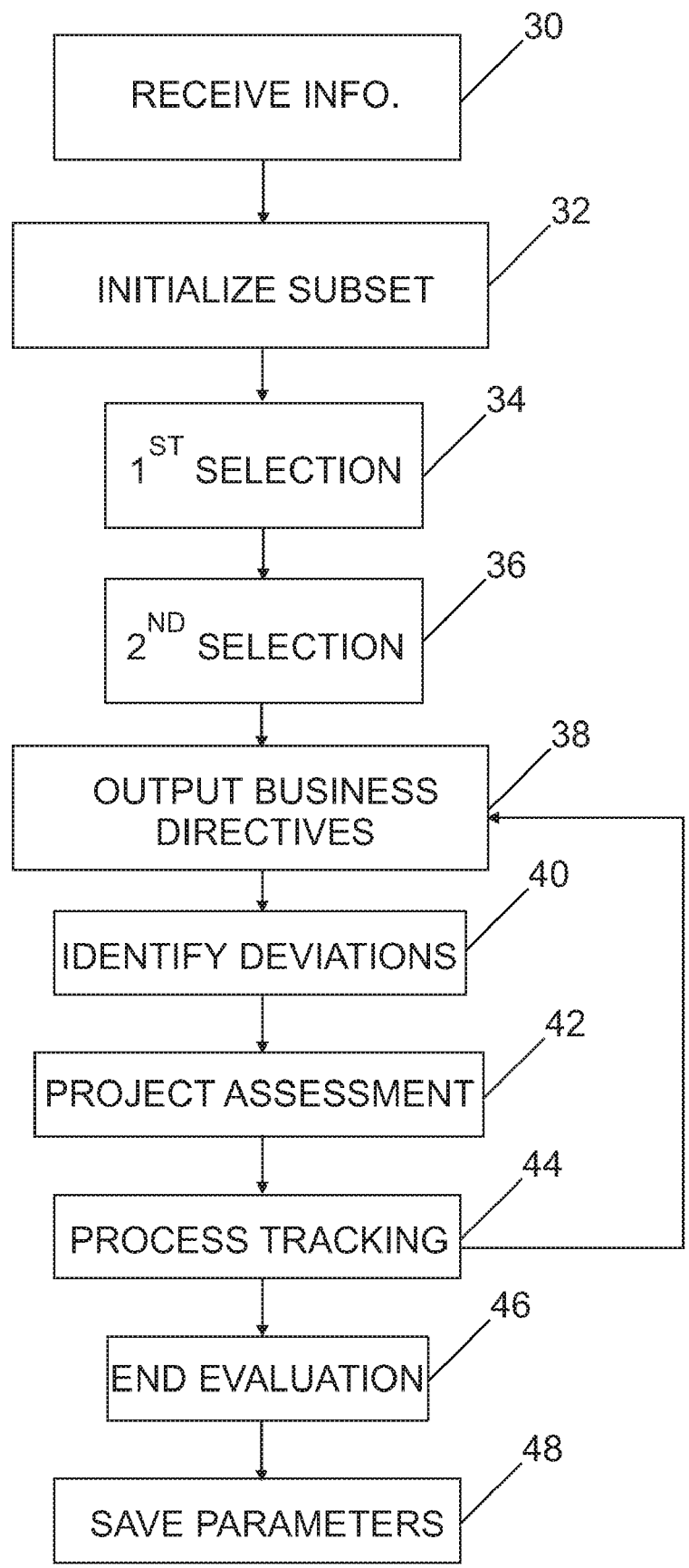
FIG. 2 is a flow diagram showing how the online metrics catalog of FIG. 1 is used in a CMMI evaluation process.

Referring to FIG. 1 and FIG. 2, in use, online metrics catalog engine 18 receives at step 30 client requirements 12 information and general business requirements 14 information. Collectively, these two sets of requirements provide online metrics catalog engine 18 with the necessary information to specify the business environment in which an evaluation is to be performed and the client's expectations of the evaluation.

Online metrics catalog engine 18 further connects to the Line of Business (LOB) golden rule directives database 16 and selects a subset of metrics (and associated rules) therefrom which best reflect client requirements 12 and general business requirements 14. For the sake of simplicity, the subset from the Line of Business (LOB) golden rule directives, will henceforth be known as business directives 26.

The subset selection process is conducted in a two-step fashion. Before the process is started, an initialization step 32 is performed in which a draft subset is established. The draft subset comprises all the metrics and rules from Line of Business (LOB) golden rule directives 16. After initialization step 32, first step 34 of the subset selection process is performed, wherein metrics that do not comply with client requirements 12 and general business requirements 14 are removed from the draft subset. For example, if there is no need to track cost, then all cost related metrics are removed from the draft subset.

The second step 36 of the subset selection process is dependent on the CMMI level the customer wishes to attain. For example, if the client only wishes to attain CMMI Level 3, no real statistical analysis is needed. Accordingly, such statistical rules are removed from the draft subset. The resulting draft subset is then output at step 38 from online metrics catalog engine 18 as business directives 26.

Business directives 26 are transferred to stakeholder alignment function 20 to identify possible deviations at step 40 from client requirements 12 or general business requirements 14. In other words, stakeholder alignment function 20 determines how the business directives will be implemented by each stakeholder in the client's customer process (e.g. suppliers, customer development team and the client's customers). During this assessment, it may become clear that some of the selected metrics cannot be tracked in the way previously defined. For example, let a metric A in business directives 26 be a computed metric calculated on a weekly basis from a number of primitive metrics. However, let the primitive metrics only be available on a monthly basis. In this case, the definition of the metric A must be updated to reflect the frequency of availability of the primitive metrics.

More specifically, stakeholder alignment function 20 compares 32 features such as data coherency, data collection procedures, specifications, objectives and plans in a stepwise manner at step 34 with client requirements 12 before activating project assessment function 22. In the event that the data coherency, data collection procedure, specification, objectives and plans do not comply with client requirements 12 or general business requirements 14, selected business directives 26 are realigned to meet the objectives of the CMMI evaluation process.

When business directives 26 match client requirements 12 and general business requirements 14; and can be provided by all the stakeholders, a project assessment 42 is performed. The results of project assessment 42 form a baseline for assessing the subsequent performance of the client.

During the lifecycle of an evaluation (data collection, metric calculation and reporting, etc.), the evaluation is continuously tracked at step 44 to determine whether it is operating properly (e.g. do the results provided from the evaluation provide the answers that the client needs). The data produced by the tracking (e.g. indicators results, log file processing and multitask operation feedback) are continually compared at step 38 and aligned with business directives 26. This enables the process to be refined and improved.

In addition, some process deviations can be eliminated by adjusting business directives at step 30 in light of the data collected from tracking process step 44. Similarly, if something has changed in the client's environment (e.g. the involvement of a new stakeholder) or there has been a change in Line of Business Golden Rules Directives database 16 (e.g. a new algorithm implementation for a specific metric), these changes are continuously taken into account in the evaluation.

Such comparisons are performed until the evaluation is ended at step 46. Once the CMMI evaluation is complete, online metrics catalog 10 saves the current evaluation parameters at step 48 in Line of Business (LoB) Golden Rules Directives database 16 for future re-use.

Modifications and alterations may be made to the above without departing from the scope of the invention.

What is claimed is:

1. A computer implemented method for automatically identifying one or more metrics for performing a Capability Maturity Model Integration (CMMI) evaluation of an entity's software development process, wherein the CMMI evaluation is performed at a particular CMMI level, said method comprising:

accessing a draft subset of metrics and rules from an electronic database, said draft subset of metrics and rules comprising a plurality of metrics used for performing the CMMI evaluation of the software development process and a plurality of rules for defining attributes of the metrics of the plurality of metrics, said CMMI evaluation having objectives, wherein the draft subset of metrics comprise metrics pertaining to parameters that affect the software development process, said metrics including at least one metric for evaluating the software development process, at least one metric for assessing productivity of the software development process, at least one metric for assessing program quality resulting from the software development process, or combinations thereof;

said computer receiving a first list of requirement elements to define a set of specific requirements of the entity;

said computer receiving a second list of requirement elements to define a set of general requirements of a business field of the entity;

after said accessing and after said receiving both the first set of requirement elements and the second list of requirement elements, said computer determining least one metric in the draft subset and at least one rule in the draft subset, subject to the at least one metric not being needed for tracking any requirement of the set of specific requirements and the set of general requirements, and subject to the at least one rule not being needed for attaining the particular CMMI level;

after said determining at least one metric, said computer removing the at least one metric from the draft subset;

after said determining at least one rule, said computer removing the at least one rule from the draft subset;

outputting the draft subset of metrics resulting from said removing the at least one metric and said removing the at least one rule;

after both said removing the at least one metric and said removing the at least one rule, said computer ascertaining that features of business directives do not comply with the set of specific requirements and/or the set of general requirements, said business directives consisting of the draft subset, wherein the features of the business directives not complying with the set of specific requirements and/or the set of general requirements comprise data coherency, data collection procedures, specifications, objectives, plans, or combinations thereof, and wherein said ascertaining comprises identifying at least one deviation between the business directives and the set of specific requirements and/or the set of general requirements; and in response to said ascertaining, said computer realigning the business directives to meet the objectives of the CMMI evaluation.

2. The method of claim 1, wherein the method is performed online.

3. The method of claim 1, wherein the method comprises:
said computer performing the CMMI evaluation; and
after said performing the CMMI evaluation, said computer storing evaluation parameters of the CMMI evaluation in the electronic database.

4. The method of claim 1, wherein the at least one metric for assessing program quality resulting from the software development process comprises the number of defects per thousand lines of code of the software development process, and wherein the at least one metric for assessing productivity of the software development process comprises lines of code of the software development process produced per person-month.

5. The method of claim 1, wherein the plurality of metrics comprise a parameter consisting of the number of trouble reports written over a specified period of time.

6. The method of claim 1, wherein the metrics and rules of the draft subset accessed comprise a first metric and rules specifying how the first metric is calculated and how the first metric may be statistically tracked.

7. A computer program product, comprising a computer readable storage medium, said medium not being a transitory signal, said medium storing program code configured to be executed by a computer to perform a method for automatically identifying one or more metrics for performing a Capability Maturity Model Integration (CMMI) evaluation of an entity's software development process, wherein the CMMI evaluation is performed at a particular CMMI level, said method comprising:

accessing a draft subset of metrics and rules from an electronic database, said draft subset of metrics and rules comprising a plurality of metrics used for performing the CMMI evaluation of the software development process and a plurality of rules for defining attributes of the metrics of the plurality of metrics, said CMMI evaluation having objectives, wherein the draft subset of metrics comprise metrics pertaining to parameters that affect the software development process, said metrics including at least one metric for evaluating the software development process, at least one metric for assessing productivity of the software development process, at least one metric for assessing program quality resulting from the software development process, or combinations thereof;

receiving a first list of requirement elements to define a set of specific requirements of the entity;

receiving a second list of requirement elements to define a set of general requirements of a business field of the entity;

after said accessing and after said receiving both the first set of requirement elements and the second list of requirement elements, determining least one metric in the draft subset and at least one rule in the draft subset, subject to the at least one metric not being needed for tracking any requirement of the set of specific requirements and the set of general requirements, and subject to the at least one rule not being needed for attaining the particular CMMI level;

after said determining at least one metric, removing the at least one metric from the draft subset;

after said determining at least one rule, removing the at least one rule from the draft subset;

outputting the draft subset of metrics resulting from said removing the at least one metric and said removing the at least one rule;

after both said removing the at least one metric and said removing the at least one rule, ascertaining that features of business directives do not comply with the set of specific requirements and/or the set of general requirements, said business directives consisting of the draft subset, wherein the features of the business directives not complying with the set of specific requirements and/or the set of general requirements comprise data coherency, data collection procedures, specifications, objectives, plans, or combinations thereof, and wherein said ascertaining comprises identifying at least one deviation between the business directives and the set of specific requirements and/or the set of general requirements; and in response to said ascertaining, realigning the business directives to meet the objectives of the CMMI evaluation.

8. The computer program product of claim 7, wherein the method is performed online.

9. The computer program product of claim 7, wherein the method comprises:
  performing the CMMI evaluation; and
  after said performing the CMMI evaluation, storing evaluation parameters of the CMMI evaluation in the electronic database.

10. The computer program product of claim 7, wherein the at least one metric for assessing program quality resulting from the software development process comprises the number of defects per thousand lines of code of the software development process, and wherein the at least one metric for assessing productivity of the software development process comprises lines of code of the software development process produced per person-month.

11. A system comprising, a computer, a computer readable storage medium, and an electronic database, said medium not being a transitory signal, said medium storing program code configured to be executed by a computer to perform a method for automatically identifying one or more metrics for performing a Capability Maturity Model Integration (CMMI) evaluation of an entity's software development process, wherein the CMMI evaluation is performed at a particular CMMI level, said method comprising:
  accessing a draft subset of metrics and rules from the electronic database, said draft subset of metrics and rules comprising a plurality of metrics used for performing the CMMI evaluation of the software development process and a plurality of rules for defining attributes of the metrics of the plurality of metrics, said CMMI evaluation having objectives, wherein the draft subset of metrics comprise metrics pertaining to parameters that affect the software development process, said metrics including at least one metric for evaluating the software development process, at least one metric for assessing productivity of the software development process, at least one metric for assessing program quality resulting from the software development process, or combinations thereof;
  receiving a first list of requirement elements to define a set of specific requirements of the entity;
  receiving a second list of requirement elements to define a set of general requirements of a business field of the entity;
  after said accessing and after said receiving both the first set of requirement elements and the second list of requirement elements, determining least one metric in the draft subset and at least one rule in the draft subset, subject to the at least one metric not being needed for tracking any requirement of the set of specific requirements and the set of general requirements, and subject to the at least one rule not being needed for attaining the particular CMMI level;
  after said determining at least one metric, removing the at least one metric from the draft subset;
  after said determining at least one rule, removing the at least one rule from the draft subset;
  outputting the draft subset of metrics resulting from said removing the at least one metric and said removing the at least one rule;
  after both said removing the at least one metric and said removing the at least one rule, ascertaining that features of business directives do not comply with the set of specific requirements and/or the set of general requirements, said business directives consisting of the draft subset, wherein the features of the business directives not complying with the set of specific requirements and/or the set of general requirements comprise data coherency, data collection procedures, specifications, objectives, plans, or combinations thereof, and wherein said ascertaining comprises identifying at least one deviation between the business directives and
  the set of specific requirements and/or the set of general requirements; and
  in response to said ascertaining, realigning the business directives to meet the objectives of the CMMI evaluation.

12. The system of claim 11, wherein the method is performed online.

13. The system of claim 11, wherein the method comprises:
  performing the CMMI evaluation; and
  after said performing the CMMI evaluation, storing evaluation parameters of the CMMI evaluation in the electronic database.

14. The system of claim 11, wherein the at least one metric for assessing program quality resulting from the software development process comprises the number of defects per thousand lines of code of the software development process, and wherein the at least one metric for assessing productivity of the software development process comprises lines of code of the software development process produced per person-month.

* * * * *